Feb. 9, 1937.     L. A. MURRAY ET AL     2,069,967
ELECTRICAL WIRING AND INSTRUMENT HOLDING CONDUIT
Filed Jan. 9, 1936
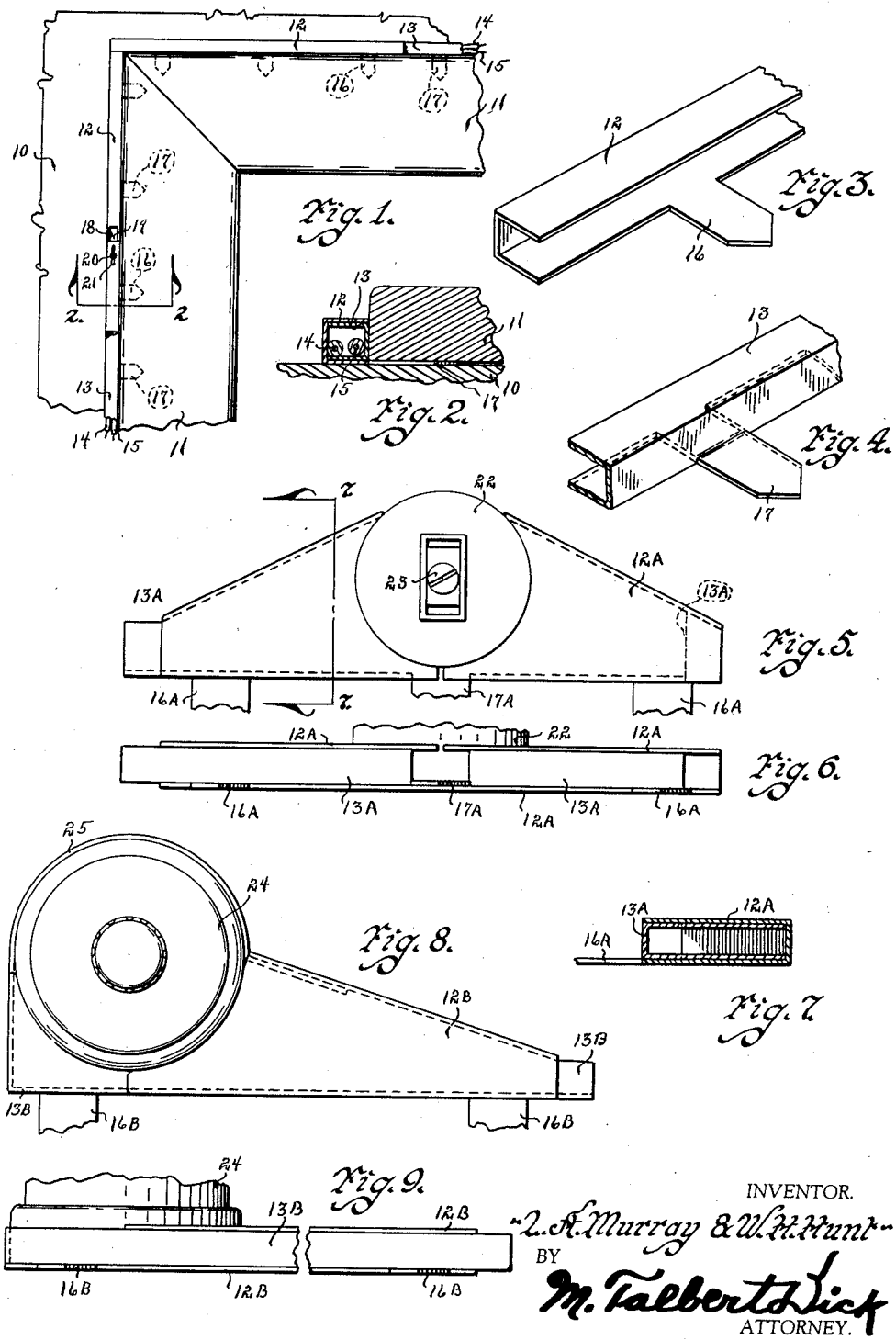
INVENTOR.
L. A. Murray & W. H. Hunt
BY
M. Talbert Dick
ATTORNEY.

UNITED STATES PATENT OFFICE 2,069,967

ELECTRICAL WIRING AND INSTRUMENT HOLDING CONDUIT

Larkin A. Murray and Wayne H. Hunt, Des Moines, Iowa

Application January 9, 1936, Serial No. 58,336

2 Claims. (Cl. 247—37)

The principal object of our invention is to provide a conduit for holding electrical lead lines, switches, outlet plugs, and like that may be detachably secured to a window, door, or like molding.

A further object of this invention is to provide an electrical wiring conduit that may be easily disassembled for the placement of an electrical lead line therein or for the inspection of wiring already in it.

A still further object of our invention is to provide a metallic conduit that may be easily and quickly installed without screws, bolts, nails, or like, and one that is refined in appearance after it is installed.

A still further object of our invention is to provide a holding conduit for wiring, switches, outlet plugs, etc., that is economical in manufacture and durable in use.

These and other objects will be apparent to those skilled in the art.

Our invention consists in the construction, arrangement, and combination of the various parts of the device, whereby the objects contemplated are attained as hereinafter more fully set forth, pointed out in our claims and illustrated in the accompanying drawing, in which:

Fig. 1 is a front view of our conduit attached to a molding on a wall and in use.

Fig. 2 is a cross-sectional view of our conduit taken on line 2—2 of Fig. 1.

Fig. 3 is a perspective view of a portion of the outer shell of the conduit.

Fig. 4 is a perspective view of a portion of the inner shell of our conduit.

Fig. 5 is a front view of a portion of our conduit holding and embracing an outlet plug.

Fig. 6 is a side view of the portion of the conduit shown in Fig. 5 adjacent the holding molding.

Fig. 7 is a cross-sectional view of our conduit taken on line 7—7 of Fig. 5.

Fig. 8 is a front view of our conduit holding and embracing a switch.

Fig. 9 is a side view of the portion of our conduit shown in Fig. 8, adjacent the holding molding.

The running of electrical lead wires through conduits is old. Such conduits are usually of the tubular type and while they are excellent for certain installations they are undesirable for others. Perhaps their chief objection is that they cannot be successfully used for running wiring around moldings. The reasons for this are that they cannot be bent flush around corners, have no fastening means in themselves, require the wiring to be threaded through them, and do not hold or make a neat connection at the switch or outlet plug at the end of the wiring. We have overcome such objections as will hereinafter be appreciated.

Referring to the drawings, we have used the numeral 10 to designate an ordinary wall having a window, door, or like molding 11. It is to such a wall and molding that we detachably secure our conduit which will now be explained. The wiring conduit consists of two elongated pieces, i. e., an outer shell 12 and an inner shell 13. These shells 12 and 13 are each of channel construction or U-shaped in cross-section, as shown in Fig. 3 and Fig. 4. Then the outer shell and inner shell are assembled into a conduit. They are invertedly nested with their open sides toward each other, as shown in Fig. 2. As the outer shell embraces the inner shell the top side of the outer shell overlaps the top side of the inner shell, and the bottom side of the outer shell overlaps the bottom side of the inner shell. We have used the numerals 14 and 15 to designate ordinary electrical lead wires, which may be placed in the conduit before it is installed or at the time of installation, as will hereinafter be explained. The numeral 16 designates a plurality of spaced apart pointed fingers integrally formed on the marginal edge of the bottom side of the outer shell. These fingers 16 extend outwardly from the shell parallel with and in the same direction as that of the bottom side of the outer shell of which they are a part.

The numeral 17 designates a plurality of similar spaced apart pointed fingers integrally formed on the inner shell. These fingers 17 are partially formed by cutting the bottom side of the inner shell and bending the resultant fingers under and back to directions where they extend in the opposite direction from that of the bottom side of the inner shell, as shown in Fig. 4. By this construction the fingers 17 extend in an opposite direction to the bottom side but are substantially parallel with the bottom side of the inner shell.

When the two shells are assembled these fingers 16 and 17 extend in the same direction and are substantially flush with the bottom side of the conduit. To attach the conduit to a molding it is merely necessary to cause the fingers 16 and 17 to extend between the molding and wall, as shown in Fig. 1. The frictional grip of the wall and molding on the fingers will be such as to successfully yieldingly detachably hold the conduit flush adjacent the side of the molding, with the central side of the inner shell against the molding. As the outer shell embraces the inner shell no longitudinal joints where the two shells join will be observable, thereby making for a refined appearing conduit. Also the fingers 16 and 17 are hidden and no fastening means can be seen. If desired, the inner shell may be placed on the molding first, thereby leaving an open channel for the reception of the wiring. After the wiring is in place the outer shell may be placed around the inner shell and into place adjacent the molding. This makes for a finished square joint. The entire conduit may be removed when desired by moving it outwardly from the molding until the fingers 16 and 17 are free from between the wall and molding, or if desired only the outer shell may be removed, thereby exposing the wiring.

The installation of our conduit is very easy and does not require the services of a skilled workman. It may be installed during the construction of a building or installed in old buildings. Its use is particularly desirable when buildings have solid partition walls and it is impossible to place conduits inside the walls. Usually such conduits lead to switches or outlet plugs and we have provided extension elements for our conduit to take care of these, and which we will now describe. We have used the numeral 22 to designate an ordinary outlet plug. The element for holding and embracing this plug has an outer shell 12A and an inner shell 13A. This outer shell 12A is formed by bending into a U-shape similar to the outer shell 12, but differs from the outer shell 12 in that its center portion is enlarged transversely of its longitudinal axis as shown in Fig. 5, and its top side is cut away to receive the plug 22. This outer shell 12A has the usual pointed fingers 16A. The inner shell 13A extends into the outer shell 12A in the same manner as the shell 13 extends into the shell 12. The inner shell 13A generally conforms to the inside outline of the outer shell 12A, as shown by dotted lines in Fig. 5, and is also cut away to accommodate the plug 22. This shell 13A has the usual fingers 17A and it and the outer shell 12A are secured to the molding in the same manner as the shells 12 and 13.

Although we show a plug 22 in Fig. 5 and Fig. 6, obviously this construction also lends itself to a switch if the electrical lead lines are to extend beyond this point. The plug 22 is held in place by the usual screw 23. The inner shell 13A may extend beyond the end of the shell 12A to receive the end portion of an outer shell 12. Likewise, in the other end of the shell 12A a conduit may extend, thereby making both ends of the plug holding conduit portion neat. In Fig. 8 and Fig. 9, we show a conduit portion for holding a switch 24 when the lead lines end at this point. In this construction we use the numeral 12B to designate the outer shell portion and the numeral 13B to designate the inner shell. This switch holding conduit portion is similar to the plug holding portion except the inner shell 13B has its outer end closed and continued in the form of a band which is wrapped around the switch 24. The free end of this band is held by being overlapped by the outer shell 12B as shown in Fig. 8. The inner shell 13B has its inner end extending beyond the outer shell 12B to receive the end portion of an outer shell 12, the outer shells 12, 12A, and 12B being of uniform depth. The numeral 16B designates the usual fingers on the outer shell 12B. Obviously the inner shells 13A and 13B may be installed first before the outer shells in the same manner as the inner shells 13. Later, the outer shell is placed over the inner shell, closing its open side. The shells 12 and 13 may be in any length sections.

Some changes may be made in the construction and arrangement of our improved electrical wiring and instrument holding conduit without departing from the real spirit and purpose of our invention, and it is our intention to cover by our claims any modified forms of structure or use of mechanical equivalents which may be reasonably included within their scope.

We claim:

1. In a conduit of the class described, two elongated metallic strips each bent longitudinally of its length; said two strips capable of nesting with each other to form an elongated conduit, and projections on each of said two strips designed to extend between the molding and plaster of a house wall for holding and supporting said two strips.

2. In a device of the class described, a plurality of elongated inner sections U-shaped in cross-section, a plurality of outer sections U-shaped in cross-section, embracing the open sides of said inner sections respectively; one of said inner sections and one of said outer sections cut away to receive and hold an electrical device, and a closing band on said last-mentioned inner section closing the end of said inner section and designed to embrace said electrical device and have its free end engaged by said last-mentioned outer shell section.

LARKIN A. MURRAY.
WAYNE H. HUNT.